Nov. 5, 1929.  H. R. HOLMES  1,734,167
SUSPENSION INSULATOR FITTING
Filed July 7, 1926   2 Sheets-Sheet 1
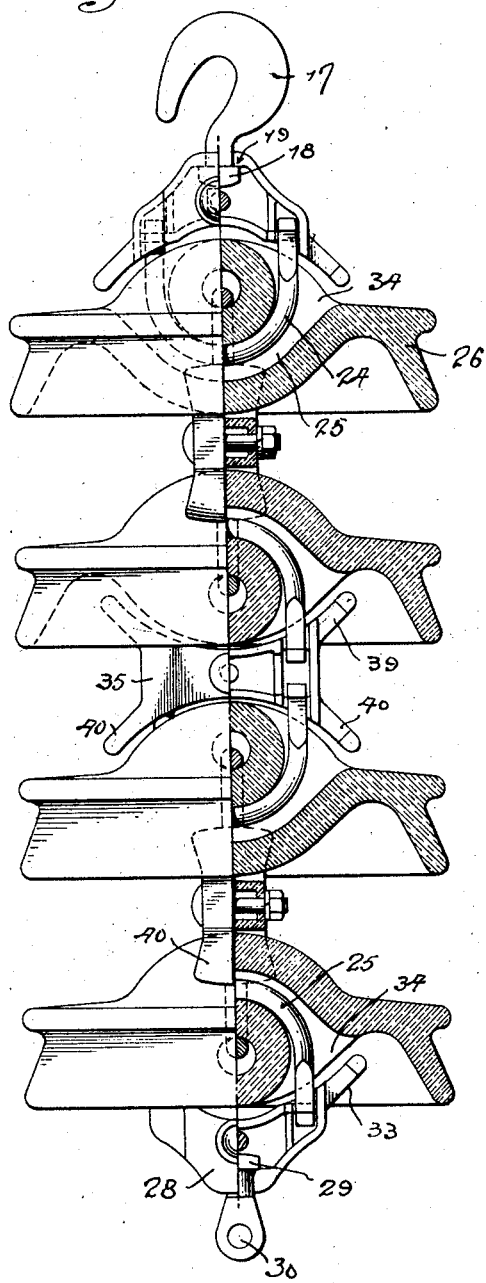
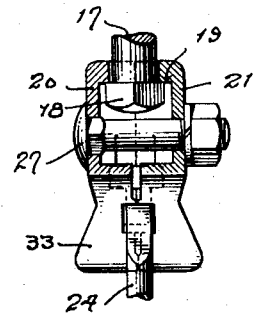
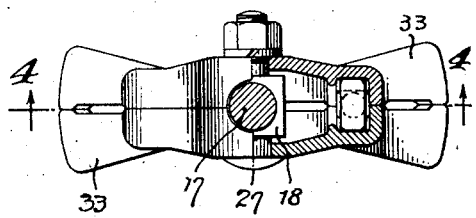
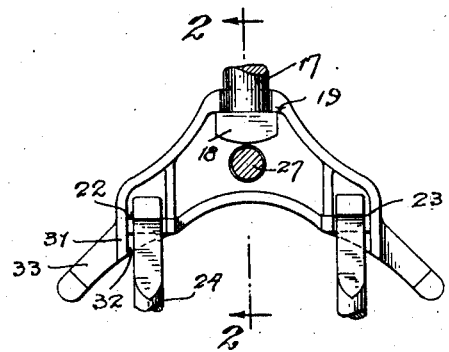
Inventor
HENRY R. HOLMES
By his Attorneys

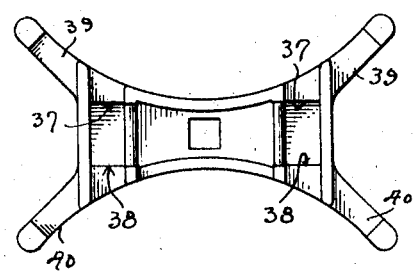
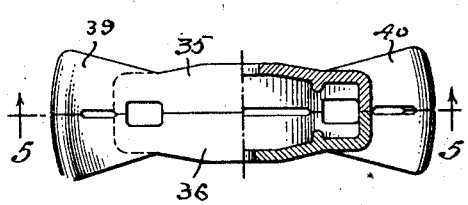
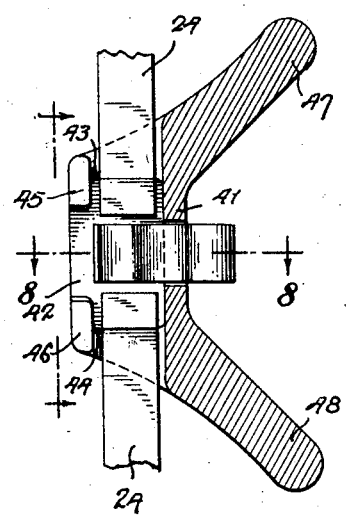
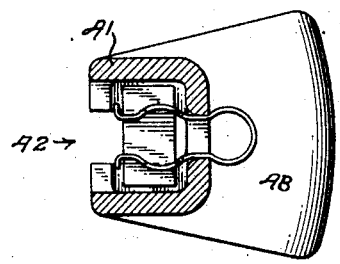
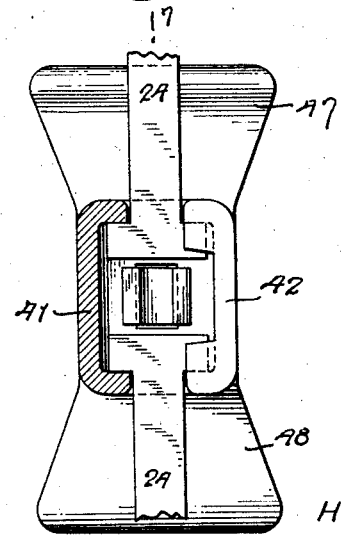

Patented Nov. 5, 1929

1,734,167

UNITED STATES PATENT OFFICE

HENRY R. HOLMES, OF EAST LIVERPOOL, OHIO, ASSIGNOR TO THE R. THOMAS & SONS COMPANY, OF EAST LIVERPOOL, OHIO, A CORPORATION OF OHIO

SUSPENSION INSULATOR FITTING

Application filed July 7, 1926. Serial No. 120,995.

My invention relates to suspension insulator fittings, and particularly to terminal and intermediate fittings to which the links of Hewlett type insulator strings are connected. The object of my invention is to provide fittings which will protect these connecting links against injury in case of line disturbances which cause flash over.

For insulators of this type it is customary to supply copper suspension links. The play of a high voltage arc on a copper link rapidly destroys it. Since the links constitute the supporting elements of the insulator string, the line is dropped, with consequent interruption of service and injury to line equipment.

While danger of link injury is greatest at the opposite ends of the string, inasmuch as an arc when formed, commonly jumps the entire insulator string, it is advisable nevertheless to protect the intermediate links which connect adjacent insulator units, as well as those which connect the end units to the terminal fittings. I have accordingly shown both types in the accompanying drawings, in which—

Fig. 1 is a side elevation of a suspension insulator string to which my invention is applied in one form;

Fig. 2 is a section on the line 2—2, Fig. 4, through one of the terminal fittings drawn to a larger scale;

Fig. 3 is a broken plan view thereof;

Fig. 4 is a section on the line 4—4, Fig. 3;

Fig. 5 is a section on the line 5—5, Fig. 6;

Fig. 6 is a broken plan of an intermediate fitting;

Fig. 7 is a section on the line 7—7, Fig. 9;

Fig. 8 is a section on the line 8—8, Fig. 7; and

Fig. 9 is a broken face view of an intermediate fitting of modified construction.

The insulator string may be supported in any fashion, for example by means of a suspension hook 17. The shank of the hook is provided with an enlarged head 18 which rests in the seat 19 afforded by the top flanges of the complementary malleable iron castings 20 and 21 which form the terminal suspension fitting. Seats 22 and 23 faced in the opposite direction and located at the ends of the fitting receive the heads of the top U-link 24, the shank of which passes as usual through the arcuate way 25 in the body of the adjacent insulator 26. A cross bolt 27 unites the castings after the hook 17 and link 24 have been assembled with the fitting.

A like fitting 28, inverted, and at the lower end of the string, is engaged by a bottom link 29 and a suspension eye 30, to which a cable clamp (not shown) is attached.

In their usual form the suspension fittings leave exposed to the play of an arc, the shank portions of the top and bottom links 24 and 29 which are not housed either within the fittings or within the passageways through their associated insulator units. On flash over the arc is apt to play upon these exposed portions of the links and to so seriously injure the latter that the line is dropped, with resulting interruption of service and injury to line equipment.

To minimize this danger, I construct the terminal fittings in such manner that they shield their associated links from the arc at these heretofore exposed points. In the form shown in Figs. 1 to 4 (see particularly Fig. 4) the end 31 and the side walls 32 of the fitting are extended toward the insulator beyond the link head seats 22, 23, while an apron-like extension 33 not only transversely spans the flared mouth 34 of the linkway 25 in the insulator, but it also bridges the mouth 34 substantially throughout its extent. Preferably the face of the apron adjacent the insulator body is curved to the contour of the latter and closely approaches it.

On flash over the arc is thus compelled to play, not upon the link, but upon the shielding portions of the suspension fitting, which is capable of withstanding the heat of the arc without serious injury.

As above stated, it is also advisable to provide intermediate fittings of such shape that the links of adjacent insulator units are similarly shielded from the arc. In Figs. 1, 5 and 6 I have indicated such an intermediate fitting composed of complementary castings 35 and 36, the upper and lower walls of which are shaped to afford at each end of the fitting, opposed seats 37 and 38 to receive the heads of the adjacent ends of the opposed links. At each end the fitting is shaped to form oppositely flared aprons 39 and 40, the faces of which adjacent the insulators, are curved to follow the contour of the insulator hub, and are of sufficient width to span the mouth of the linkway. On flash over, should an arc strike into the insulator string intermediate its ends, it will now play, not upon the links, but upon the link shields thus afforded by the intermediate fittings.

In Figs. 7, 8 and 9 I have shown another form of intermediate fitting. In this modification, the same thought is applied to one-piece fittings of the type which receive the link heads through lateral gates. The fitting shown is of the type adapted to receive the heads at the ends of one leg only of opposed links. Each fitting comprises an integral casting 41, open at one side to afford a gateway 42 through which the link heads may be passed to the opposed seats 43, 44; the shank of each link being passed through a slot 45 or 46 which extends from each of the seats to the lateral gateway 42. The wall of the fitting opposite the gate 42 is extended and flared to form aprons 47—48, which span and overlie the linkway mouths 34 formed in the hubs of adjacent insulators and serve, as in the construction just described, to shield the links from the play of the arc thereon.

Modifications which accomplish the same or like results, without departing from what I claim as my invention, will readily occur to those skilled in the art.

I claim—

1. A suspension insulator comprising a plurality of insulator units, an upper and a lower arcuate way for a U-link in each unit, a U-link passing through each arcuate way, and suspension fittings for connecting certain of the U-links of adjacent insulators, said fittings being so shaped as to conform to the contour of the insulator units and to inclose portions of the U-links and their arcuate ways.

2. In a suspension insulator, U-links an insulator unit having upper and lower arcuate ways adapted to receive said U-links, in combination with a fitting having upper and lower connecting means at least one of which means is adapted to hold the legs of a U-link, said fitting being so shaped as to conform to the contour of the insulator unit adjacent to it and to enclose portions of the U-link and to substantially close its arcuate way.

3. In a suspension insulator, U-links, an insulator unit having upper and lower arcuate ways adapted to receive said U-links, in combination with a coupling device having upper and lower connecting means adapted to hold the legs of U-links, said device comprising integral apron-like extensions adjacent its ends adapted to overlie portions of the U-link between the coupling and the insulator to shield the link against play of an arc thereon.

4. In an insulator, comprising insulator units each unit having upper and lower arcuate ways, upper and lower U-links passing through said ways, in combination with a coupling device cooperating with U-links and comprising apron-like extensions adjacent the ends of the coupling, said extensions at each end diverging fan-like between the coupling and the insulator units to shield the link against the play of an arc thereon.

In testimony whereof I have signed my name to this specification.

HENRY R. HOLMES.